(12) United States Patent
Turk et al.

(10) Patent No.: US 6,276,619 B1
(45) Date of Patent: Aug. 21, 2001

(54) METHOD AND SYSTEM FOR PRODUCING PRESCRIPTION ANIMAL BEDDING FROM RECYCLED PAPER WASTE PRODUCTS

(75) Inventors: William N. Turk, Homer, GA (US); Marvin Johnson, Williamston, MI (US)

(73) Assignee: Cellulose Technologies Group, Inc., Charlotte, NC (US)

( * ) Notice: Subject to any disclaimer, the term of this patent is extended or adjusted under 35 U.S.C. 154(b) by 0 days.

(21) Appl. No.: 08/856,717

(22) Filed: May 15, 1997

Related U.S. Application Data

(60) Provisional application No. 60/017,755, filed on May 16, 1996.

(51) Int. Cl.[7] .............................. B02C 19/12; B02C 23/18
(52) U.S. Cl. .......................... 241/21; 241/24.19; 241/28; 241/29; 241/38; 241/79.1; 241/152.2; 241/DIG. 38
(58) Field of Search ...................................... 241/21, 24.14, 241/24.19, 27, 28, 29, 38, 79.1, 152.2, DIG. 38

(56) References Cited

U.S. PATENT DOCUMENTS

| | | | | |
|---|---|---|---|---|
| 4,191,224 | * | 3/1980 | Bontrager et al. | 141/100 |
| 4,198,799 | * | 4/1980 | McGrath | 53/121 |
| 4,228,964 | * | 10/1980 | Brady | 241/186.3 |
| 4,454,992 | * | 6/1984 | Draganov | 241/42 |
| 4,869,433 | * | 9/1989 | Lewellin | 241/18 |
| 5,372,314 | * | 12/1994 | Manning | 241/21 |
| 5,667,150 | * | 9/1997 | Arasmith et al. | 241/18 |
| 5,890,665 | * | 4/1999 | Arasmith et al. | 241/55 |

* cited by examiner

Primary Examiner—John M. Husar
(74) Attorney, Agent, or Firm—Todd Deveau; Ryan A. Schneider; Troutman Sanders LLP

(57) ABSTRACT

A method and system for producing an animal bedding material from recycled waste paper, and including one or more chemical additives. The base material is fiberized, and the chemical additives may include: pesticides, disease immune additives (medicines), ammonia inhibitors, fire retardants, or other additives, depending on the characteristics desired of the final product. At least one of the additives is applied as a liquid.

24 Claims, 3 Drawing Sheets

METHOD AND SYSTEM FOR PRODUCING PRESCRIPTION ANIMAL BEDDING FROM RECYCLED PAPER WASTE PRODUCTS

This application claims benefit of Provisional application Ser. No. 60/017,755 filed May. 16, 1996.

BACKGROUND OF THE INVENTION

1. Field of the Invention

The present invention relates generally to a method and system for recycling paper products and other recyclable cellulosic materials, and more specifically to a method and system for producing animal bedding from waste paper products such as old newsprint by shredding and fiberizing the waste paper stock and then treating the fiberized paper with additives which may include: pesticides, disease immune additives (medicines), ammonia inhibitors, fire retardants and other materials, depending upon the specific application and desired characteristics of the final product.

2. Description of Related Art

Discarded paper products make up approximately thirty-eight percent of the total waste stream. With available landfill space decreasing, recycling of paper products has become necessary. It has been found that a variety of useful products may be manufactured from recycled paper products. This has the dual benefit of reducing the volume of waste which must be landfilled, and enabling the production of a variety of useful materials at a relatively low raw material cost.

Paper waste, such as old newsprint can be recycled by known recycling techniques to produce a variety of products, including building insulation, animal bedding, soil amendment mulch, spill absorbents, boiler fuel pellets and packaging materials Low-density cellulose insulation can be made from paper fibers obtained from most types of bulk waste paper stock. The most common type of bulk waste paper stock used for insulation is old newsprint. To make cellulose insulation from newsprint, the newsprint is shredded and fiberized prior to being mixed with a fire retardant chemical. Air cells within the shredded paper make the product lightweight and provide the thermal resistance necessary to make a high quality building insulation. Other chemical additives may be introduced to the insulation product, such as pesticides, moisture inhibitors, and/or colorants.

Waste paper stock can also be recycled to produce soil amendment mulch for soil conditioning, erosion control or seedling protection. The paper is shredded or chipped, and additives are introduced to fertilize the soil, resist or accelerate decomposition, provide products of different colors and provide pesticides.

Waste paper can also be recycled to produce a spill absorbent material for cleaning up liquid spills. Additives can be provided to spill absorbents which improve the absorbency of the product, resist flammability and neutralize a variety of chemicals. Boiler fuel pellets and packing materials can also be produced from recycled paper waste.

Because of the different characteristics required for each application, the methods of producing each of these products vary greatly, as do the products themselves. For example, a variety of additives can be provided along with the recycled paper base material, to impart characteristics desirable for the specific application.

In the field of animal bedding, for example, it has been found desirable to introduce additives including pesticides, disease immune additives (medicines), ammonia inhibitors and fire retardants. Providing the bedding with pesticides and disease immune additives protects the health of the animals using the bedding. Ammonia inhibitors help to control fumes and odors caused by animal waste, thereby reducing the ventilation necessary. This reduces the expense of electricity used to run the ventilating fans in the animal pens, and also reduces heating expenses, as less heat is lost through the ventilation exhaust. It has also been found desirable to provide a bedding material having higher thermal insulative properties than known bedding materials, thereby also helping to reduce heating expenses.

Known bedding materials and known methods of producing these materials have been found to be less than adequate in use. For example, commonly used bedding materials such as wood shavings and sawdust do not provide good thermal insulation, and are flammable. Also, these materials are increasingly used for other applications, such as producing "particle board" building materials, fuels, and for other uses. This has resulted in increased costs and decreased availability.

These known bedding materials also lack the pesticidal, disease-inhibiting and ammonia-inhibiting characteristics which have been found desirable, and may, in fact, promote the proliferation of pests and disease. In the past, in order to provide known bedding materials such as wood shavings and sawdust with pesticidal and disease inhibiting qualities, it has been necessary to first lay down the bedding material, next spray the bedding with a medicinal disease inhibitor, and finally, spread a pesticide over the bedding. This three step process is labor-intensive and results in substantial down-time for the facility.

Previous attempts to use recycled paper waste as animal bedding have proved less than successful. Simple shredded paper has been found to be less than entirely satisfactory as a bedding material, as it lacks sufficient absorbency and thermal insulating capacity. This is primarily due to the fact that shredded paper tends to compress, or lie flat when used. Because normal shredded paper does not "loft," it does not provide good surface coverage (i.e., low surface area covered per unit weight). It has also been found that chemical additives do not adhere to the surfaces of simple shredded paper as well as would be desired, and that the material does not decompose as readily as would be desired.

Thus, it has been found that a need exists for a method and system of producing an animal bedding from recycled waste paper products, which enables the addition of various additives to the recycled paper product, thereby permitting the product's characteristics to meet a variety of requirements.

For example, it has been found that a need exists for a method and system for producing an animal bedding product with additives to provide fire resistance, to help control insects and rodents, to deliver disease immune additives to the animals, to provide a more sterile bedding material, and to inhibit ammonia fumes and odors due to animal waste. It is also desirable that a "ready-to-use" bedding material be provided, thereby eliminating labor-intensive bedding treatment procedures and their inherent facility down-time.

There also exists a need for a method and system capable of applying a sufficient quantity of additives to a paper base material in a manner which causes the additives to adhere to the base material.

A need further exists for a method and system of producing an animal bedding material having good thermal insulating qualities, high absorbency, high surface coverage per unit weight, and high loft in use.

A need also exists for an economical method and system for making an animal bedding material meeting these needs from readily available waste products, thereby reducing the amount of waste to be landfilled.

It is to the provision of a method and system meeting these and other needs that the present invention is directed.

SUMMARY OF THE INVENTION

Briefly described, in a preferred form, the present invention comprises a method and system for producing a prescription animal bedding material from cellulosic waste products, such as paper, paper sludge, peanut hulls, wood shavings (green or dry), rice hulls and straw. The preferred base material is recycled paper waste, such as old newsprint. A "prescription" animal bedding will be understood to be a bedding material wherein one or more additives are applied to the bedding's base material in a specified quantity and manner, so as to impart the bedding material with certain desired characteristics.

The preferred form of the system and method of the present application uses mechanical and pneumatic material handling equipment to move waste paper stock from one process machine to the next. The process machines consist of a primary grinder, a fiberizer and a moiler. Various other components can be included to produce a more effective and marketable product. The system and method of a preferred form of the present invention are briefly described below.

The process, in its preferred form, begins with dumping waste paper stock onto a charge conveyor. A metal detector is provided along the path of the conveyor to help prevent metal from entering the system. The waste paper travels along the conveyor and drops into a primary grinder. The primary grinder reduces the size of the waste paper stock to paper chips. A primary transfer blower pulls the paper chips away from the grinder and into a cyclone separator. The cyclone separates the paper chips from the air stream and directs them into a fiberizer tank. Typically, the air stream from which the paper chips have been removed continues on from the cyclone to a dust collector. Screw feeders in the fiberizer surge tank, and a second separate air stream, meter and direct the paper chips out of the surge tank into a fiberizer.

The fiberizer is a size-reduction process machine which receives the paper chips from the surge tank and grinds the relatively large chips into very small paper fibers. Because the paper is reduced to a "fiberized" state, rather than simply shredded, more surface area is exposed, and the material is fluffier than ordinary shredded paper. This gives the material greater loft and surface coverage, better absorbency, and better thermal insulative qualities than ordinary shredded paper.

A dry chemical additive may be provided to the fiberized material through a chemical mixer/hopper connected to the fiberizer. The chemical mixer can include a chemical feeder, which meters and feeds the additive to a pulverizer. The pulverizer grinds solid chemical additives and blows the additives into the inlet of the fiberizer. Because the material is fiberized, rather than simply shredded, more surface area is exposed on which the additive may attach. Thus, increased additive-to-base material ratios can be achieved.

A secondary transfer blower helps to pull the paper chips from the fiberizer surge tank and the chemical additive from the pulverizer through the fiberizer, and through a moiler located downstream from the fiberizer. The moiler is an in-line process device that introduces an atomized mist of liquid additives into the paper fibers. These liquid additives can include pesticides, disease immune additives (medicines), ammonia inhibitors, fire retardants and other additives, depending on the desired characteristics of the final product. It has been found that the introduction of liquid additives through the moiler promotes greater adherence of dry additives to the base material, thereby enabling higher additive-to-base material ratios and more accurate control of the mixture.

After the introduction of liquid additives in the moiler, the product is ready for packaging. A diverter valve can be installed at the moiler outlet to allow the product to be discharged to either a bulk discharge system or a baler.

Accordingly, it is an object of the present invention to provide a method and system for producing a prescription animal bedding material from a recycled cellulosic material such as waste paper, and permitting the addition of a variety of specialized additives) in either liquid or solid form, to the final product.

DESCRIPTION OF THE DRAWING FIGURES

DETAILED DESCRIPTION OF A PREFERRED EMBODIMENT

Figure 1:
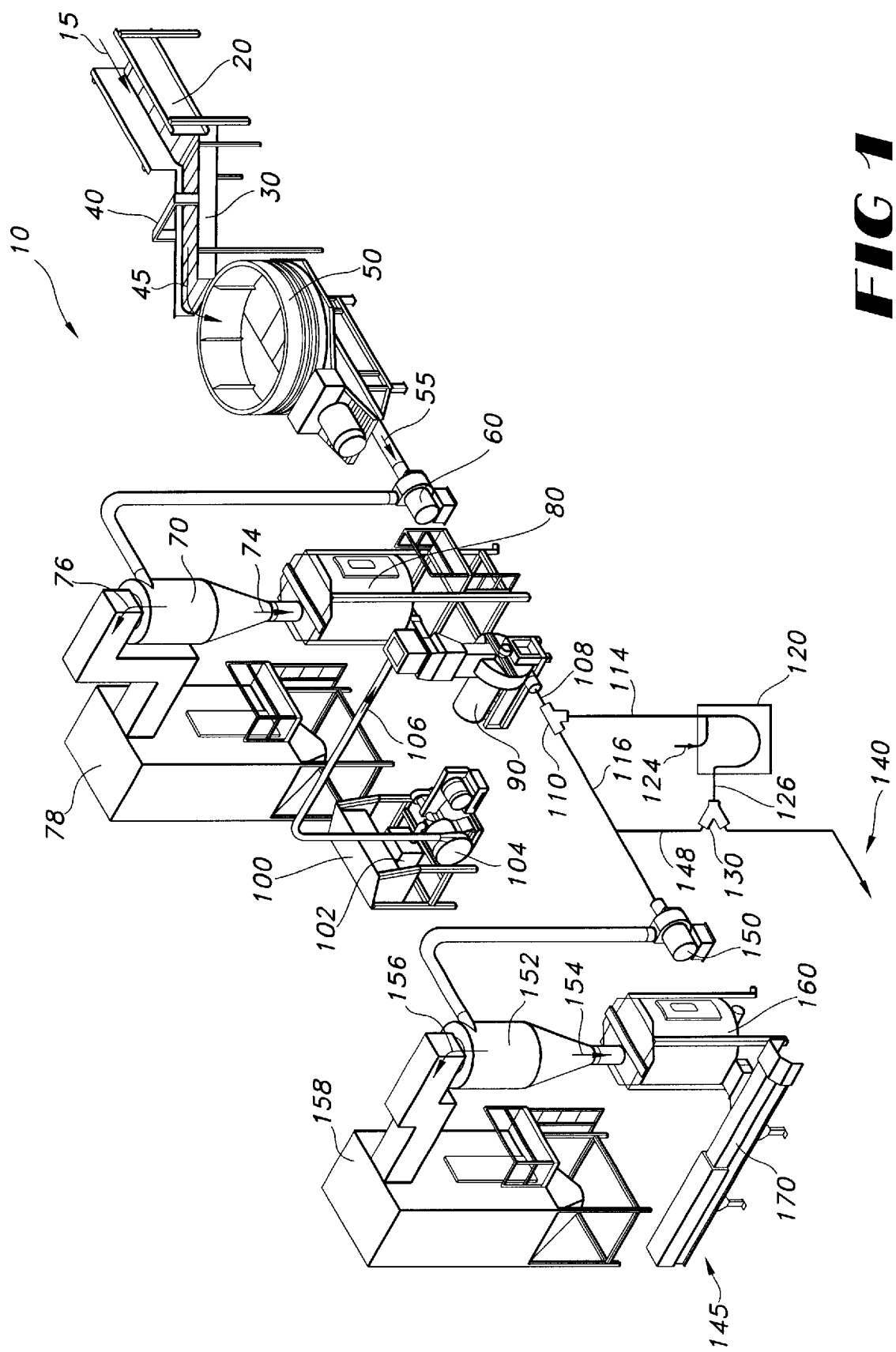
FIG. 1 is a perspective view of a recycling system according to a preferred form of the present invention.

Referring now in detail to FIG. 1, a system 10 for recycling cellulosic materials such as waste paper products is shown. The system 10 receives waste paper feed 15 which can be old newsprint, telephone books, magazines, paper sludge, or any other suitable paper product. Alternatively, other materials such as peanut hulls, green or dry wood shavings, rice hulls, straw, or any other readily available negative material can be used as a base material for the process described herein. The cellulosic material is preferably less than twenty percent moisture. Waste paper feed 15 is received by a charge conveyor 20 from a wheel loader (unshown) or any other means for loading the conveyor. A driven conveyor belt moves the waste paper feed 15 along the charge conveyor 20, which discharges to an inclined conveyor 30.

Inclined conveyor 30 receives waste paper feed 15 from charge conveyor 20, and includes a driven conveyor belt which moves the waste paper feed 15 along the inclined conveyor 30. A metal detector 40 can be provided over the driven conveyor belt to assist in metal removal from the waste paper feed 15. Metal detector 40 can be interlocked with the driving means for the driven conveyor belt to automatically stop the conveyor and sound an alarm when metal is detected, so that the metal can be manually removed. Alternatively, an automatic metal removal system incorporating magnets or other metal removal means can be provided.

Inclined conveyor 30 discharges paper feed with metal removed 45 to a primary grinder 50. Primary grinder 50 preferably is a tub grinder comprising grinding elements directly coupled to an electric rotor drive and, in preferred form, is capable of reducing hard-cover textbooks with no pregrinding required. An air stream through the primary grinder 50, generated by the primary transfer blower 60 described below, is preferably provided to clear paper from the rotor. An example of a suitable primary grinder is the DuraTech Industries International Inc. Model No. EC-900. Primary grinder 50 reduces the size of the paper feed 45 into approximately two inch (2") paper chips. As the paper chips exit the primary grinder 50 they are entrained in paper chip discharge flow 55. It will be understood by those of ordinary skill in the art that a hammer mill may be used in place of the described tub grinder.

Paper chip discharge flow 55 is pulled from the primary grinder 50 by a primary transfer blower 60. The discharge from the primary transfer blower 60 enters a cyclone separator 70, which separates the paper chips 74 from the air stream 76. Air stream 76 is directed to a dust collector 78 which removes dust from the air stream by means of air permeable bags, filters, or other dust separation means. Dust collector 78 also preferably includes means for shaking dust from the collection bags or filters, and means for removing and collecting the accumulated dust. Clean air is exhausted from the dust collector 78 to the atmosphere. DuraTech Model No. 6108 has been found to provide satisfactory performance as a dust collector. In some instances, it may be desirable to reintroduce the dust collected by dust collector 78 into the process stream. This can be achieved by providing an auger-driven discharge from the dust collector 78 to the point in the system where reintroduction of the dust is desired.

Paper chips 74, separated by the cyclone separator 70, are discharged to a fiberizer surge tank 80 which provides an airlock to assist the cyclone in separating the paper chips 74 from the discharge flow 55. Fiberizer surge tank 80 also provides an airtight seal to prevent the escape of paper fiber dust to the work area. By holding a quantity of paper chips 74, surge tank 80 ensures a continuous supply of chips to the fiberizer, described below. The fiberizer surge tank 80 is preferably provided with agitating or vibration-inducing means to prevent the paper chips 74 from bridging the outlet, and to ensure a smooth flow from fiberizer surge tank 80 to the fiberizer 90.

Transparent windows can be provided in the walls of the fiberizer surge tank 80 to permit visual confirmation of grinder performance, and to provide visual confirmation of paper chip flow. DuraTech Model No. 7280 has been found to provide suitable performance as fiberizer surge tank 80.

Feeder screws, gravity, or other transfer means transfer the paper chips 74 from fiberizer surge tank 80 to a fiberizer 90. Fiberizer 90 is a size reduction process machine which receives paper chips from the surge tank 80 and grinds or "smears" the relatively large paper chips 74 between two large discs having a plurality of ridges thereon. This process transforms the chips into very small paper fibers 108. For animal bedding material, it has been found that sizes of 2–26 mm result in the best quality product. DuraTech Model No. LDF-2 has been found to provide suitable performance as a fiberizer 90.

After fiberizing the cellulosic chips, it may be preferable to add further cellulosic material to the fibers for some applications. As stated above, the dust collected after grinding the material may be reintroduced. Furthermore, materials such as ungrounded rice hulls may be added for bulk.

One or more dry chemical additives 106 can be introduced to the paper fibers 108. The dry chemical additives 106 are preferably introduced in the fiberizer, which agitates the mixture of paper fibers 108 and dry chemical additives 106 during the grinding to provide more thorough and even distribution of the dry chemical additives 106. Dry chemical additives 106 are often obtained in bulk solid or pellet form, and are loaded in chemical mixing hopper 100 for use. A chemical feeder 102 supplies dry chemical additives to a pulverizer 104 which pulverizes the dry chemical additive 106 prior to introduction into the paper fibers 108.

Paper fibers 108, which are discharged from the fiberizer 90, are preferably transferred to a moiler 120 via a moiler feed line 114. The fibers are pneumatically transported through the moiler by means of a blower or fan, such as the secondary transfer blower 150. A diverter valve 110 can be provided at the discharge of fiberizer 90 to transfer the paper fibers 108 via moiler bypass 116 for immediate packaging in the event the use of the moiler is unnecessary in a given application.

Figure 2:
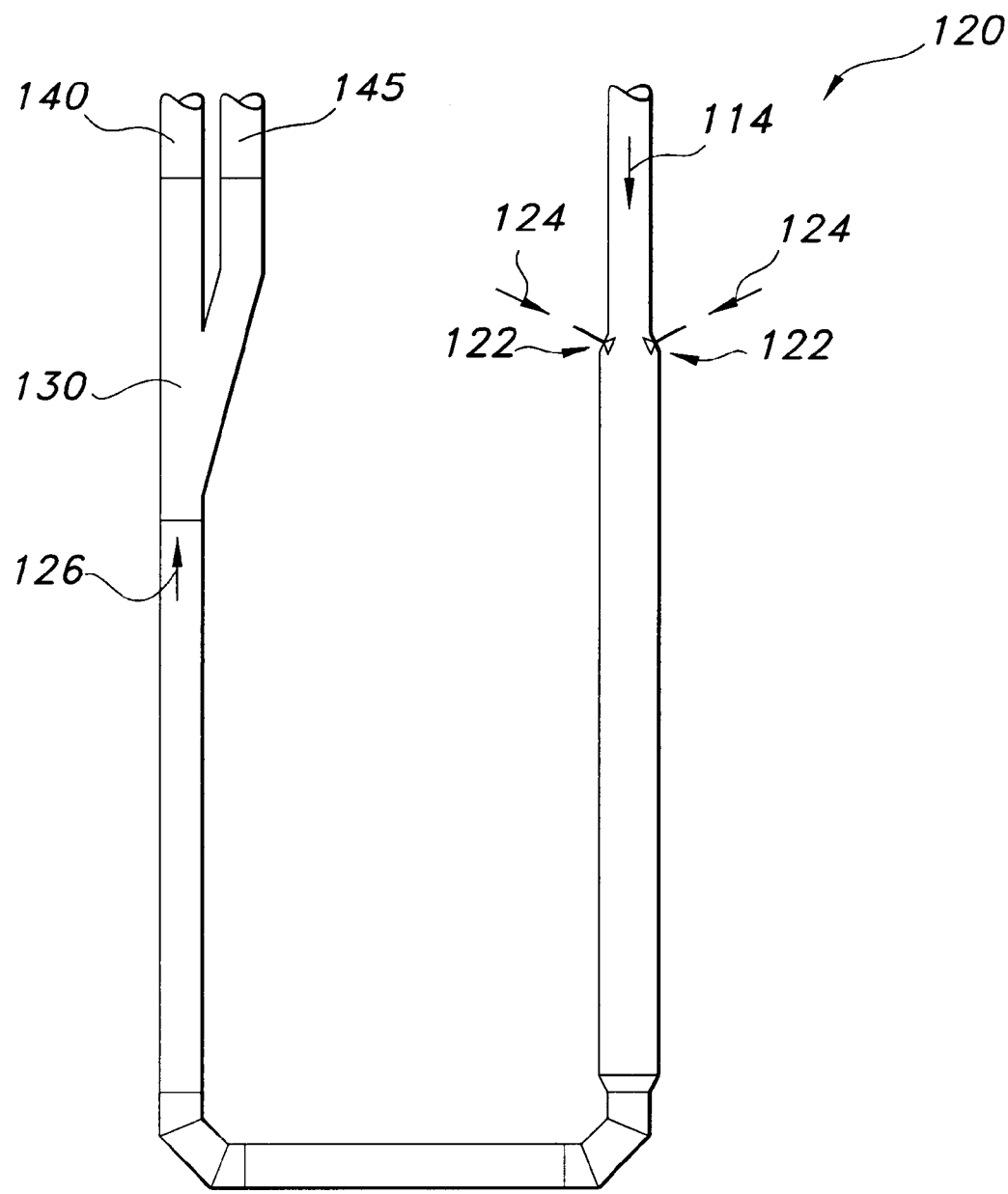
FIG. 2 shows, in greater detail, a preferred from of the moiler portion of the recycling system of FIG. 1.

As shown in greater detail by FIG. 2, the moiler 120 is an apparatus which allows introduction of liquid additives 124 into the paper fibers 108 comprising moiler feed 114 The introduction of liquid additives, as opposed to (or in addition to) dry additives, has been found advantageous, as it allows a more even and thorough distribution of the additive to the paper fibers. Liquid additives readily adhere to the fibers, and also promote greater adherence of dry additives to the fibers.

Due to the fact that the fiberized paper is very light and aerodynamic, while commonly used dry additives are relatively heavy and less aerodynamic, dry additives introduced according to known methods often do not properly attach to the paper fibers and will drop out of the product as the product is processed and pneumatically conveyed. This often results in uneven application of the dry additives to the final product.

To overcome this problem, previous manufacturing methods have simply increased the volume of the dry additives to ensure that a minimum amount of additives is provided throughout the final product. Increasing the volume of dry additives, however, results in corresponding increases in production costs. By introducing additives in liquid form, it has been found that a consistent blend of paper fibers and additive, and better adherence between the additive and the fibers are provided. By providing a consistent, even mix of additive and paper fibers, the overall usage of additives may be minimized, increasing system efficiency without sacrificing product quality. The specific additives which are applied to the paper fibers will vary, depending upon the desired characteristics and application of the final product.

The moiler 120 includes one or more atomizers 122 which mix a liquid additive 124 with pressurized air, supplied from an unshown compressor or air pump, and inject the air/liquid additive mixture onto the paper fibers 108. A liquid holding tank or reservoir can be provided for maintaining a working quantity of the liquid additive 124. The liquid additive 124 can be pumped from the liquid holding tank, or can be gravity fed. It is preferable that the liquid additive 124 and the pressurized air be supplied at constant pressures and flow rates to ensure a consistent and even mix of liquid additive 124 with paper fibers 108.

The moiler 120 preferably comprises duct work of varying diameters, thereby creating eddies in the air flow through the moiler 120. These eddies impart a mixing, tumbling action on the paper fibers 108 in the moiler 120 to enhance the liquid/solid mixture, as well as allowing the dry and liquid additives time to adhere onto the surfaces of the paper fibers 108 traveling through the duct work. The moiler volume and dimensions will vary depending upon a number of factors, including: the throughput of the system, the quantity of additives introduced, and the drying time of the liquid additives.

The moiler 120 may include removable conduit which facilitates easy clean-cut and enables observation of moiler activity. Although the figures show the moiler 120 as a separate component, it will be understood by those of ordinary skill in the art that moiler 120 can be combined with fiberizer 90, or at any point downstream from the fiberizer 90 in the paper flow. The atomized injection of liquid additive 124 onto the paper fibers 108, which is enabled by the moiler 120 has been found in practice to permit an additive/paper mix of up to twenty percent additive by weight. Thus, a much higher additive content is enabled, as compared to the use of dry chemical additives alone.

Moiler discharge 126, comprising paper fibers 108 and liquid additive 124 may alternatively be routed either to a bulk discharge system 140 or a baler feed system 145, by diverter valve 130. If it is desired to package the material in bales, baler (cuber) feed 148 is transferred via secondary transfer blower 150, as shown in FIG. 1, to a cyclone separator 152, which separates treated fibers 154 from the air stream 156. The air stream 156 is then processed by a dust collector 158 to remove dust prior to exhausting air to the atmosphere. Treated fibers 154 are collected in a baler surge tank 160, from which the treated fibers 154 are transferred to a baler tube 170 by means of screw feeders or other transfer means. A hydraulic ram (unshown) compresses the treated fibers 154 into a bale and pushes the compressed bale into a plastic bag or other packaging material.

If it is desired to collect the final product in bulk form, diverter valve 130 will be actuated to transfer to bulk discharge system 140. A transfer blower, cyclone separator, and dust collector similar to that described above can be provided to permit separation of the treated fibers from the air flow.

Figure 3:
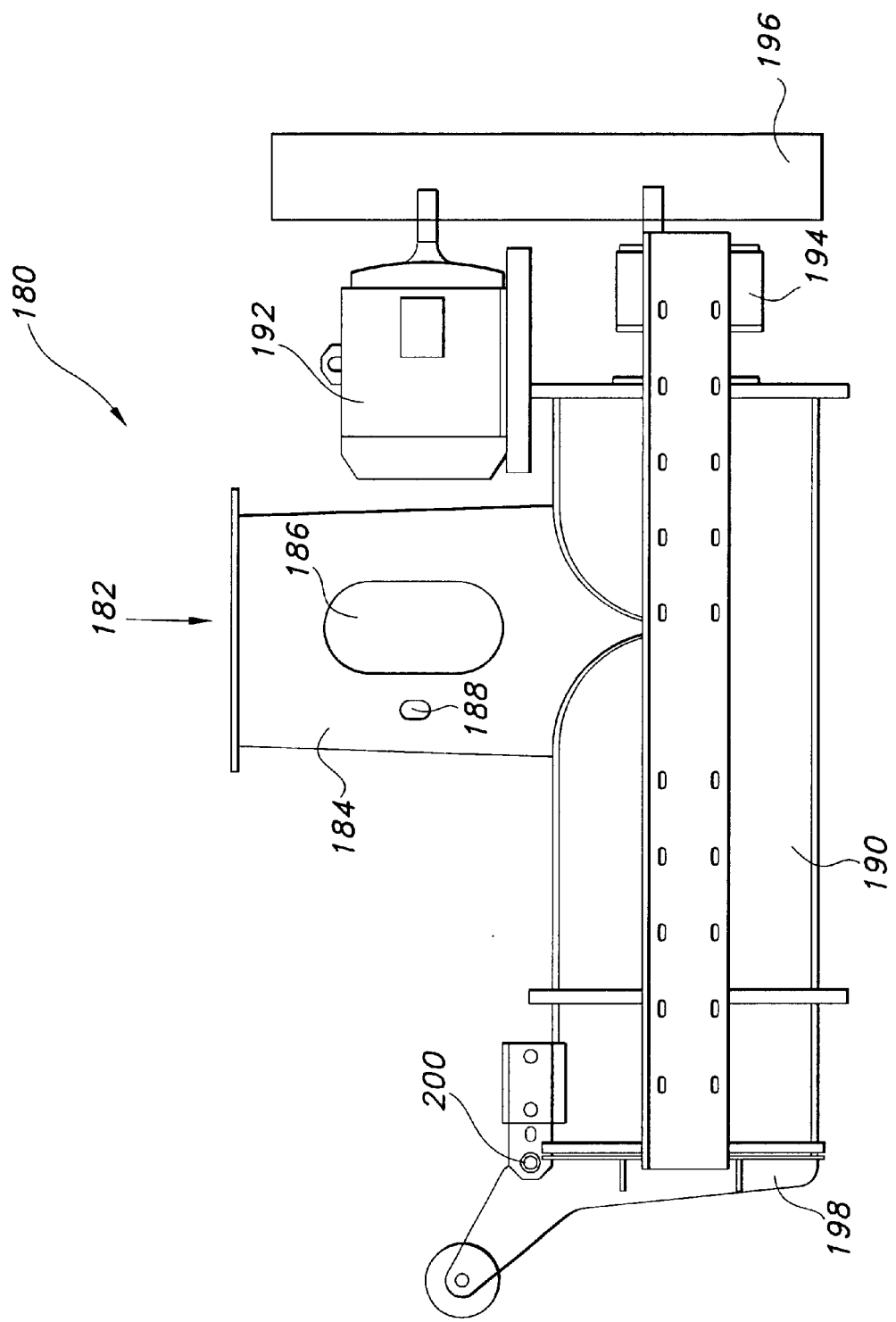
FIG. 3 shows the bulk airlock feeder portion of the bulk discharge system of the present invention.

A bulk airlock feeder 180, shown in preferred form by FIG. 3, can be provided to receive the treated fibers 182 from the discharge of the bulk discharge system's cyclone separator. The bulk airlock feeder 180 receives the fibers 182 in its standpipe 184, by gravity feed. The standpipe 184 can be provided with a sight glass 186 for visual confirmation of material flow and condition. One or more level sensors 188 can also be provided for remote monitoring and control, and to shut the system down in the event of a blockage.

The treated fibers 182 discharge from the standpipe 184 into a generally horizontal discharge tube 190. Discharge tube 190 houses an auger (unshown) which is rotationally driven, as by a motor 192 and a gearbox 194. A chain or belt drive, or other transmission means (unshown), transmits power from the motor 192 to the gearbox 194 and auger (unshown). A belt or chain guard 196 is preferably provided.

As the unshown auger rotates, it propels the fibers 182 through the discharge tube 190, in the direction of discharge hatch 198. Discharge hatch 198 is connected to discharge tube 190 by hinge means 200. By attaching the discharge hatch 198 in the manner shown by FIG. 3, the weight of the hatch 198 acts to maintain the hatch 198 in its closed position. As the auger presses the fibers 182 against the closed discharge hatch 198, air is squeezed from the fibers to compress the product somewhat for easier handling.

When a sufficient quantity of compressed fibers 182 have accumulated against the discharge hatch 198, the action of the auger against the fibers 182 will force the discharge hatch 198 at least partially open, thereby permitting compressed fibers 182 to discharge from the bulk airlock feeder to a bulk collection station below.

The height of the standpipe 184 and the length of the discharge tube 190 are selected to allow the creation of an "airlock" within the bulk airlock feeder 180. The airlock is achieved when the standpipe 184 and the discharge tube 190 are filled with fibers 182, to a level which prevents air from the discharge of the cyclone separator from passing through the bulk airlock feeder. This minimizes the creation of dust due to pressurized air blowing through the product. DuraTech Model No. AF-1 has been found to provide acceptable results when used as the bulk airlock feeder 180.

The animal bedding produced by the method and system described above has been found to be particularly well-adapted for use in the poultry industry. The fiberized nature of the bedding produced by the method and system of the present invention makes the bedding more fluffy than simple shredded paper. This fluffy bedding is more absorbent, offers better thermal insulating properties, decomposes faster, covers more area per pound of bedding, is easier to handle than simple shredded paper, and does not hang onto the feet of bedded animals. The increased surface area created by fiberizing the base material also allows better adherence between the base material and additives.

The introduction of liquid additives to the material through the use of a moiler, as described above, enables a more even and consistent mix of additives and base material, and improves the adhesion between the base material and the additives. Additives including: antiseptics, fire retardants, pesticides, disease immune additives (medicines), ammonia inhibitors, borates, colorants and fragrance may be provided to the animal bedding product.

Ammonia inhibitors such as Inhibitor™ and Ammonia Hold™ have been found effective as additives for controlling fumes and odors due to animal waste. Ammonia fumes have been found to lead to higher mortality, poor feed conversion, respiratory tract damage, decreased weight gains, airsacculitis, eye damage and increased disease severity in chickens. The normal manner of controlling ammonia fumes is through ventilation. Ventilation fans, however, consume electricity and, during cold weather, exhaust needed heat from the facility. Thus, the addition of ammonia inhibitors to the bedding, and the resulting reduction in needed ventilation, can significantly improve the profitability of poultry production operations.

Pesticides such as orthoboric acid, boron-10 (produced by Incide™), other borates, Safecide™, and others have been found effective as additives for controlling pests commonly found in poultry production facilities. Fungicides, antiseptics, antibacterials, and a variety of other medicinal agents may be included as additives. Disease immune additives such as Happy Chick™ may also be included within the scope of the present invention. Because the present invention enables an even and consistent application of the selected additive or additives, and improved adherence of the additive to the base material, the production of a variety of "prescription" bedding products, each having specified desired characteristics, is made possible.

The fiberized animal bedding produced by the method and system of the present invention has also been found to have greater water absorbency (by weight of absorbent medium), than hammermilled paper, shredded paper, wood chips, sawdust, or cat litter. This results in less frequent bedding replacement, further improving production efficiency.

While the invention has been disclosed in its preferred forms, it will be apparent to those skilled in the art that many modifications, additions and deletions can be made therein without departing from the spirit and scope of the invention and its equivalents.

What is claimed is:

1. A method for producing an animal bedding material from cellulosic waste, the method comprising the following sequential steps of:

a. grinding the cellulosic waste to form cellulosic chips;
b. fiberizing the cellulosic chips to form cellulosic fibers; and then
c. introducing at least one liquid additive to said cellulosic fibers to form said animal bedding material.

2. A method as claimed in claim 1, wherein said cellulosic waste is selected from the group consisting of paper, paper sludge, peanut hulls, wood shavings, rice hulls and straw.

3. A method as claimed in claim 1, wherein step of grinding forms cellulosic chips approximately 2 inches in size and cellulosic dust.

4. A method as claimed in claim 3, further comprising the steps of:
   a1. combining said cellulosic chips and said cellulosic dust with a first air stream; and
   a2. removing said cellulosic chips from said first air stream.

5. A method as claimed in claim 1, further comprising the step of adding at least one dry chemical additive to said cellulosic fibers.

6. A method as claimed in claim 1, wherein said liquid additive is introduced to said cellulosic fibers by an atomizer at substantially constant pressure and flow rate.

7. A method as claimed in claim 6, wherein said cellulosic fibers are mixed and tumbled while introducing said liquid additive to said cellulosic fibers.

8. A method as claimed in claim 7, wherein said cellulosic fibers are mixed and tumbled by combining said cellulosic fibers with a second air stream and passing said air stream through a duct work of varying diameters.

9. A method as claimed in claim 1, wherein said liquid additive is added to said cellulosic fibers up to 20% additive by weight.

10. A method as claimed in claim 1, wherein said liquid additive is selected from the group consisting of antiseptics, fire retardants, pesticides, disease immune additives, ammonia inhibitors, borates, colorants, and fragrances.

11. A method as claimed in claim 1, further comprising the step of compressing said animal bedding material.

12. A system for producing an animal bedding material from cellulosic waste, said system comprising:
   a. a primary grinder for receiving said cellulosic waste and grinding said cellulosic waste to produce cellulosic chips and cellulosic dust;
   b. a fiberizer for processing said cellulosic chips to form cellulosic fibers; and
   c. means for introducing a liquid additive to said cellulosic fibers.

13. A system as claimed in claim 12, wherein said primary grinder is a tub grinder or a hammermill.

14. A system as claimed in claim 12, further comprising means for creating a first air stream and combining said cellulosic chips and cellulosic dust with said first air stream and directing said first air stream away from said grinder into a first cyclone separator.

15. A system as claimed in claim 14, wherein first cyclone separator removes said cellulosic chips from said first air stream.

16. A system as claimed in claim 15, further comprising a dust collector for removing said cellulosic dust from said first air stream.

17. A system as claimed in claim 12, further comprising means for introducing a dry chemical additive to said cellulosic fibers.

18. A system as claimed in claim 12, wherein said means for introducing a liquid additive is a moiler.

19. A system as claimed in claim 18, wherein said moiler comprises an atomizer.

20. A system as claimed in claim 19, wherein said atomizer introduces said liquid additive at a substantially constant rate.

21. A system as claimed in claim 20, wherein said moiler further comprises means for creating a second air stream and a ductwork of varying diameters; wherein said second air stream is combined with said cellulosic fibers and flowed through said ductwork of varying diameters.

22. A system as claimed in claim 21, further comprising a second cyclone separator for separating said cellulosic fibers from said second air stream.

23. A system as claimed in claim 22, further comprising a bulk discharge system.

24. A system as claimed in claim 22, further comprising a baler feed system.

* * * * *